US008566395B2

(12) United States Patent
Shi et al.

(10) Patent No.: US 8,566,395 B2
(45) Date of Patent: Oct. 22, 2013

(54) METHOD AND APPARATUS FOR TRANSMITTING HYPERTEXT TRANSFER PROTOCOL MEDIA

(75) Inventors: Teng Shi, Nanjing (CN); Yuanyuan Zhang, Nanjing (CN); Peiyu Yue, Nanjing (CN); Weizhong Yuan, Nanjing (CN); Guangyuan Liu, Nanjing (CN); Renzhou Zhang, Nanjing (CN); Yonghui Tian, Nanjing (CN); Chuxiong Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 13/340,121

(22) Filed: Dec. 29, 2011

(65) Prior Publication Data
US 2012/0096083 A1  Apr. 19, 2012

Related U.S. Application Data

(63) Continuation of application No. PCT/CN2010/075474, filed on Jul. 27, 2010.

(30) Foreign Application Priority Data

Sep. 21, 2009 (CN) .......................... 2009 1 0175674

(51) Int. Cl.
*H04N 21/482* (2011.01)

(52) U.S. Cl.
USPC ............. 709/203; 725/37; 725/38; 725/40; 725/41; 725/56; 725/61; 725/86; 725/87; 725/88; 725/90; 725/95; 725/100; 725/101; 725/102; 725/104; 709/202; 709/204; 709/205; 709/206

(58) Field of Classification Search
USPC ................ 709/203, 204, 205, 206, 207, 208; 725/37–41, 56, 61, 86–88, 901, 95, 725/100, 101, 102, 104
See application file for complete search history.

(56) References Cited

U.S. PATENT DOCUMENTS

2003/0126605 A1 * 7/2003 Betz et al. ...................... 725/39
2004/0196849 A1   10/2004 Aksu et al.
(Continued)

FOREIGN PATENT DOCUMENTS

| CN | 1751304 A | 3/2006 |
| CN | 101212311 A | 7/2008 |

(Continued)

OTHER PUBLICATIONS

Office Action issued in corresponding Chinese Patent Application No. 200910175674.4, mailed May 9, 2013, 22 pages.

(Continued)

*Primary Examiner* — Kenny Lin
*Assistant Examiner* — Abdelnabi Musa
(74) *Attorney, Agent, or Firm* — Brinks Hofer Gilson & Lione

(57) ABSTRACT

In the field of media transmission technologies, a method and an apparatus for transmitting Hypertext Transfer Protocol (HTTP) media are provided, which solve a problem that a specific capability mode to be used cannot be determined when both a server and a client have enhanced functions. In the method and system for transmitting the HTTP media, the respective information of HTTP streaming media capabilities supported by the server and by the client are obtained. According to the obtained information of the HTTP streaming media capabilities supported by the server and supported by the client, the HTTP streaming media capability used by the server or the client in a subsequent media transmission procedure is determined. The server provides media services according to the determined HTTP streaming media capability; or the client obtains the media services according to the determined HTTP streaming media capability.

6 Claims, 10 Drawing Sheets

(56) References Cited

U.S. PATENT DOCUMENTS

| | | |
|---|---|---|
| 2005/0267946 A1* | 12/2005 | An et al. .................. 709/217 |
| 2008/0189430 A1* | 8/2008 | Klemets .................. 709/231 |
| 2010/0142516 A1* | 6/2010 | Lawson et al. ............ 370/352 |
| 2011/0271326 A1 | 11/2011 | Liang |
| 2012/0191851 A1* | 7/2012 | Lohmar et al. ............ 709/224 |

FOREIGN PATENT DOCUMENTS

| | | |
|---|---|---|
| CN | 101282339 A | 10/2008 |
| CN | 101478755 A | 7/2009 |
| WO | 2007/051385 A1 | 5/2007 |

OTHER PUBLICATIONS

International Search Report issued in corresponding PCT Application No. PCT/CN2010/075474; mailed Nov. 4, 2010.

Written Opinion of the International Searching Authority issued in corresponding PCT Patent Application No. PCT/CN/2010/075474, mailed Nov. 4, 2010.

Extended European Search Report issued in corresponding European Patent Application No. 10816635.6, mailed Mar. 23, 2012.

Office Action issued in corresponding Chinese Patent Application No. 200910175674.4, mailed Dec. 24, 2012.

Office Action issued in corresponding Chinese Patent Application No. 200910175674.4, mailed Jun. 21, 2012.

\* cited by examiner

METHOD AND APPARATUS FOR TRANSMITTING HYPERTEXT TRANSFER PROTOCOL MEDIA

CROSS-REFERENCE TO RELATED APPLICATIONS

This application is a continuation of International Application No. PCT/CN2010/075474, filed on Jul. 27, 2010, which claims priority to Chinese Patent Application No. 200910175674.4, filed on Sep. 21, 2009, both of which are hereby incorporated by reference in their entireties.

FIELD

The present disclosure relates to the field of communications technologies, and in particular, to a method and an apparatus for transmitting Hypertext Transfer Protocol (HTTP) media.

BACKGROUND

HTTP progressive download is an improved mode of HTTP file download, and enables a client to download and play at the same time, instead of playing after completing downloading the whole file. An implementation principle is to fragment media content, and one (or a group of) content fragment(s) can be independently decoded by the client. In this way, the client may decode and play after receiving one (or a group of) content fragment(s), and meanwhile, the client may also receive a next (or a next group of) content fragment(s).

In one implementation solution of the HTTP progressive download based on an Internet Protocol (IP) Multimedia Subsystem (IMS), an Adapter HTTP Proxy is introduced between a Service Control Function (SCF) and an HTTP server. The Adapter HTTP Proxy supports a Session Initiation Protocol (SIP) and an HTTP. The Adapter HTTP Proxy has an HTTP interface connected to an SIP interface of the SCF, to an HTTP interface of the HTTP server, and to the client directly.

However, the HTTP progressive download still has the following defects. The progressive download supports operations such as Backward Seek for parts of content that are already downloaded locally. However, for parts of content that are not downloaded, operations such as Fast Forward and Forward Seek are not supported. Therefore, based on the HTTP progressive download, an enhanced streaming content transmission mode based on HTTP is developed, which is referred to as HTTP Streaming. Enhanced functions may include: management and maintenance of play control, converting a play request based on time to a request for specific content fragments; and bit rate adaptation based on known information such as bandwidth.

At present, the enhancement of the HTTP Streaming is implemented by different solutions. The enhancement may be implemented by enhancing a server, or implemented by enhancing a client. Moreover, in specific application, the server and the client may query whether the other party supports the HTTP Streaming, for example, adding a "Pragma" header in an HTTP message to carry an extended instruction defined by a 3rd Generation Partnership Project (3GPP) to query whether the other party supports 3GPP HTTP Streaming. The instruction may be "3gpp-http-streaming". In a returned message, if a value is true or 1, the instruction represents that the other party supports the HTTP Streaming.

The inventor finds that the prior art has at least the following problems. The above solution can only determine whether the other party supports the HTTP Streaming, but the following situations may exist. The enhanced server can support both the common client and the enhanced client, and the enhanced client can support both the common server and the enhanced server. In this situation, when the enhanced server and the enhanced client interact with each other, it is possible to cause service chaos during media transmission.

SUMMARY

Embodiments of the present disclosure provide a method and an apparatus for transmitting HTTP media, so as to avoid chaos in a media transmission procedure after determining an HTTP streaming media capability to be used for media transmission.

In order to achieve the above objectives, the embodiments of the present disclosure adopt solutions as follows.

A method for transmitting HTTP media includes: obtaining information of HTTP streaming media capabilities supported by a server having a processor and information of HTTP streaming media capabilities supported by a client; determining the HTTP streaming media capability used by the server or the client in a subsequent media transmission procedure according to the obtained information of the HTTP streaming media capabilities supported by the server and the obtained information of the HTTP streaming media capabilities supported by the client; and providing, by the server, media services according to t he determined HTTP streaming media capability; or obtaining, by the client, the media services according to the determined HTTP streaming media capability.

An apparatus for transmitting HTTP media includes: a first capability obtaining unit, configured to obtain information of HTTP streaming media capabilities supported by a server and information of HTTP streaming media capabilities supported by a client; a first determination unit, configured to determine the HTTP streaming media capability used by the server or the client in a subsequent media transmission procedure according to the obtained information of the HTTP streaming media capabilities supported by the server and the obtained information of the HTTP streaming media capabilities supported by the client; and a service obtaining unit, configured to obtain media services according to the determined HTTP streaming media capability.

An apparatus for transmitting HTTP media includes: a second capability obtaining unit, configured to obtain information of HTTP streaming media capabilities supported by a server and information of HTTP streaming media capabilities supported by a client; a second determination unit, configured to determine the HTTP streaming media capability used by the server or the client in a subsequent media transmission procedure according to the obtained information of the HTTP streaming media capabilities supported by the server and the obtained information of the HTTP streaming media capabilities supported by the client; and a service providing unit, configured to provide media services according to the determined HTTP streaming media capability.

In the method and the apparatus for transmitting HTTP media according to the embodiments of the present disclosure, the server and the client need to determine the HTTP streaming media capabilities used by the server and the client respectively, and in the subsequent media transmission procedure, the server provides the media services according to the determined HTTP streaming media capability, and the client obtains the media services according to the determined HTTP streaming media capability. In this way, if both the server and the client support HTTP Streaming enhanced functions, by using the embodiments of the present disclosure, both the server and the client can determine the HTTP streaming media capabilities that need to be used by the server and the client respectively, and determine whether the server or the client executes the HTTP Streaming enhanced functions. Therefore, it is ensured that the client can successfully obtain content description information corresponding to the capability from the server subsequently, thereby obtaining a requested media content fragment, so as to avoid chaos caused by disputes in capability negotiation in the media transmission procedure.

BRIEF DESCRIPTION OF THE DRAWINGS

To illustrate the solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF THE EMBODIMENTS

Figure 1:
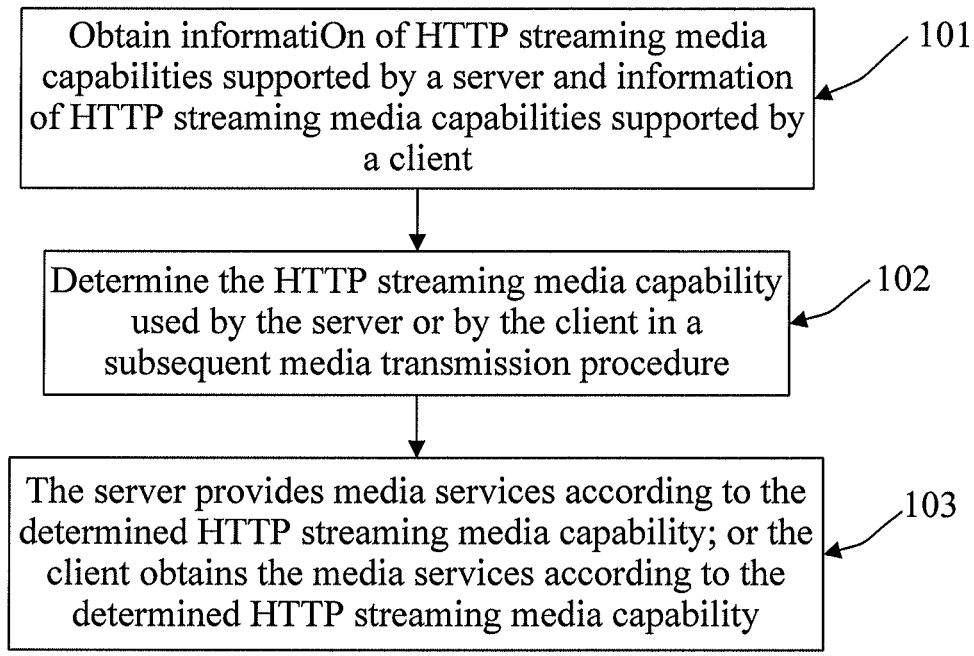
FIG. 1 is a flow chart of a method for transmitting HTTP media according to Embodiment 1 of the present disclosure.

Based on HTTP progressive download, an enhanced streaming content transmission mode based on HTTP is developed, which is referred to as HTTP Streaming. Enhanced HTTP Streaming capabilities may include capabilities as follows:

1. Play status control capability: mainly performing management and maintenance of play control, and including obtaining or receiving of play status information, management, maintenance and storage of the play status information, conversion of play status and corresponding processing, and so on;

2. Capability of converting a play request based on time to a content fragment play request, namely converting time in the play request based on information such as metadata of media content, so as to obtain a corresponding content fragment, where, for a server, the capability may further include extracting a corresponding content segment and metadata, and assembling the content segment and the metadata into a content fragment required by a client for playing; and 3. Capability for bit rate adaptation, that is, the same media content may be stored as multiple different versions according to different bit rates, for example, the same media content may be stored as different versions according to situations such as resolution, a frame rate and quality of a video, and content fragmentation is performed on different versions based on exactly the same time segment; in this manner, a next content fragment which has a different bit rate but can be seamlessly transited in terms of time may be sent when bandwidth changes, thereby achieving dynamic bit rate seamless adaptation in a content play procedure.

At present, the enhancement of the HTTP Streaming can be implemented by different solutions. The enhancement may be implemented by enhancing the server, or implemented by enhancing the client. The two different implementation solutions lead to differences in the following aspects.

First, content description information is different. For the solution of enhancing the server, the client only needs to obtain simple description information related to the content, for example, duration, content coding and an access address, etc. However, for the solution of enhancing the client, the client needs to know more information, for example, further detailed metadata information and metadata information of file levels of different versions of the same content, so that the client can independently calculate a content range of a requested fragment in a file.

Secondly, play requests are different. For the solution of enhancing the server, the play request sent by the client is based on time information or based on a play control command. However, for the solution of enhancing the client, the play request sent by the client is a content fragment request, that is, the content range of the content fragment in the file is directly specified in the play request.

The embodiments of the present disclosure provide a method and a system for transmitting HTTP media. When the enhanced server and the enhanced client interact with each other, it is determined through negotiation whether the server or the client executes HTTP Streaming functions, so that the server and the client can perform media transmission according to a determined media capability, thereby avoiding chaos in a media transmission procedure. The solutions of the present disclosure will be clearly and fully described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

Embodiment 1

An embodiment of the present disclosure provides a method for transmitting HTTP media. Referring to FIG. 1, the method for transmitting HTTP media includes the following steps.

101: Obtain information of HTTP streaming media capabilities supported by a server and information of HTTP streaming media capabilities supported by a client. The client may be a client terminal such as a computer, a phone, a tablet, or any similar terminal system.

When the client needs to obtain media from the server, in the embodiment of the present disclosure, the HTTP streaming media capabilities used by the server and the client in a subsequent media transmission procedure need to be determined first. In order to determine the HTTP streaming media capabilities used by the server and the client respectively, in the embodiment of the present disclosure, the information of the HTTP streaming media capabilities supported by the server and the information of the HTTP streaming media capabilities supported by the client need to be obtained first. The HTTP streaming media capability used herein mainly refers to whether to execute HTTP Streaming enhanced functions on the client, or execute the HTTP Streaming enhanced functions on the server. In subsequent descriptions of the embodiments of the present disclosure, the HTTP streaming media capability and HTTP Streaming capability both refer to the HTTP Streaming enhanced functions.

102: After obtaining the information of the HTTP streaming media capabilities supported by the server and the information of the HTTP streaming media capabilities supported by the client, in the embodiment of the present disclosure, the HTTP streaming media capability used by the server or by the client in a subsequent media transmission procedure may be determined according to the obtained information of the HTTP streaming media capability supported by the server and the obtained information of the HTTP streaming media capability supported by the client.

A specific determination procedure may be, but is not limited to, the solution as follows: one party of the server and the client determines the HTTP streaming media capability used thereby first, and the other party determines the HTTP streaming media capability used thereby according to the HTTP streaming media capability determined first. A specific implementation process is described in subsequent embodiments.

103: After determining the HTTP streaming media capability of the server, the server may provide media services according to the determined HTTP streaming media capability; or the client may obtain the media services according to the determined HTTP streaming media capability.

Figure 2:
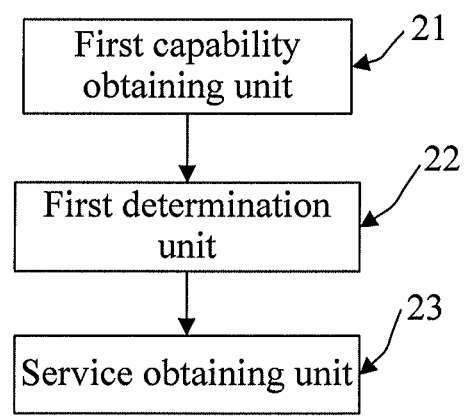
FIG. 2 is a block diagram of an apparatus for transmitting HTTP media according to Embodiment 1 of the present disclosure.

The embodiment of the present disclosure further provides an apparatus for transmitting HTTP media. As shown in FIG. 2, the apparatus includes a first capability obtaining unit 21, a first determination unit 22 and a service obtaining unit 23.

The first capability obtaining unit 21 is configured to obtain information of HTTP streaming media capabilities supported by a server and information of HTTP streaming media capabilities supported by a client. The first determination unit 22 is configured to determine the HTTP streaming media capability used by the server or the client in a subsequent media transmission procedure according to the obtained information of the HTTP streaming media capabilities supported by the server and the obtained information of the HTTP streaming media capabilities supported by the client. The HTTP streaming media capability used herein mainly refers to whether HTTP Streaming enhanced functions are executed on the client. The service obtaining unit 23 is configured to obtain media services according to the determined HTTP streaming media capability.

Figure 3:
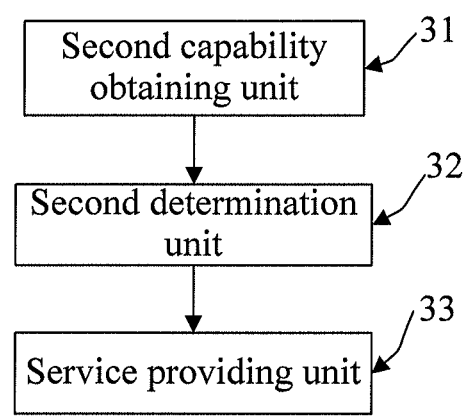
FIG. 3 is a block diagram of an apparatus for transmitting HTTP media according to Embodiment 1 of the present disclosure.

The embodiment of the present disclosure further provides an apparatus for transmitting HTTP media. As shown in FIG. 3, the apparatus includes a second capability obtaining unit 31, a second determination unit 32 and a service providing unit 33.

The second capability obtaining unit 31 is configured to obtain information of HTTP streaming media capabilities supported by a server and information of HTTP streaming media capabilities supported by a client. The second determination unit 32 is configured to determine the HTTP streaming media capability used by the server or the client in a subsequent media transmission procedure according to the obtained information of the HTTP streaming media capabilities supported by the server and the obtained information of the HTTP streaming media capabilities supported by the client. The HTTP streaming media capability used herein mainly refers to whether HTTP Streaming enhanced functions are executed on the server. The service providing unit 33 is configured to provide media services according to the determined HTTP streaming media capability.

The method and the system for transmitting HTTP media can be summarized as: the server or the client first obtains the HTTP streaming media capability supported by the other party; the server and the client negotiate the HTTP streaming media capabilities used by the server and the client respectively; after negotiating and determining the HTTP streaming media capabilities used by the server and the client respectively, the server delivers corresponding content description information, and performs subsequent HTTP Streaming processing steps based on the HTTP streaming media capability determined through negotiation.

In the method and the system for transmitting HTTP media provided according to the embodiments of the present disclosure, the server and the client need to determine the HTTP streaming media capabilities used by the server and the client respectively. During the subsequent media transmission procedure, the server provides the media services according to the determined HTTP streaming media capability, and the client obtains media according to the determined HTTP streaming media capability. In this way, if both the server and the client support the HTTP Streaming enhanced functions, by using the embodiments of the present disclosure, both the server and the client can determine the HTTP streaming media capabilities that need to be used respectively, and determine whether the server or the client executes the HTTP Streaming enhanced functions, so that the server and the client can perform media transmission according to the determined media capability, thereby avoiding chaos in the media transmission procedure. Therefore, it is ensured that the client can successfully obtain the content description information corresponding to the capability from the server subsequently, thereby obtaining a requested media content fragment, so as to avoid chaos caused by disputes in capability negotiation in the media transmission procedure.

Embodiment 2

Figure 4:
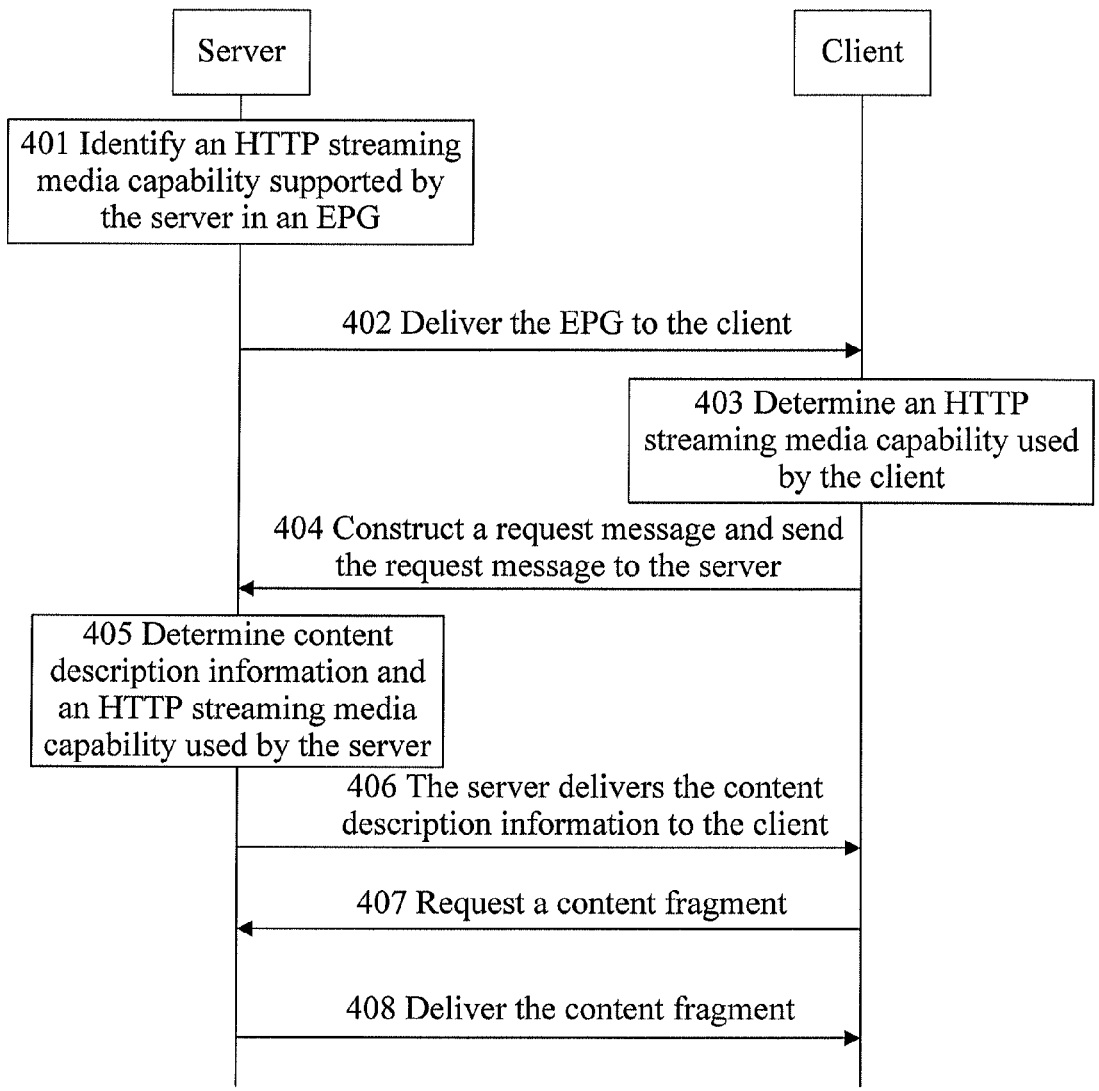
FIG. 4 is a flow chart of a method for transmitting HTTP media according to Embodiment 2 of the present disclosure.

The embodiment of the present disclosure provides a method and an apparatus for transmitting HTTP media. A solution of performing HTTP streaming media capability notification and confirmation based on an Electronic Program Guide (EPG) or based on a Service Guide (SG) is taken as an example to illustrate an application of the method for transmitting HTTP media according to the embodiment of the present disclosure in detail. Referring to FIG. 4, the method for transmitting HTTP media includes the following steps.

401: A server identifies an HTTP streaming media capability supported by the server in content description in an EPG, or the server adds a description field in the EPG to identify the HTTP streaming media capability supported by the server, for example, whether enhanced HTTP Streaming functions are supported. The step may be implemented through extending an existing EPG. If subsequent media services are sent in a unicast mode, the following solution may be used.

First, perform corresponding extension on the SG, and notify the client through the extended SG that a certain media service may be sent in an HTTP Streaming mode.

Secondly, add an identification (ID), and indicate via the ID whether the HTTP Streaming is implemented through enhancing the server.

The above HTTP streaming media capabilities include, but are not limited to, a play status control capability, a capability of converting a play request based on time to a content fragment play request, and a capability for bit rate adaptation.

402: The server delivers the EPG to the client, where the HTTP streaming media capability supported by the server is identified.

403: After receiving the EPG the client determines the HTTP streaming media capability used by the client according to the HTTP streaming media capabilities notified by the server and the HTTP streaming media capability supported by the client.

404: The client constructs a content description information request message according to the determined HTTP streaming media capability used by the client, and sends the content description information request message to the server.

In this embodiment, the client carries an ID of the HTTP streaming media capability used by the client into the content description information request message. For example, if the client determines to use an enhanced HTTP streaming media capability (a byte ranges (br) function), that is, the client needs to calculate a specific location of a content fragment in a file, so that the client can use the specific location of the content fragment to initiate a play request to the server, the capability ID carried by the request message is br. If the client determines to use an HTTP streaming media capability that is not enhanced, which means that the server needs to use the enhanced HTTP streaming media capability (a time based request (tq) function), that is, the server needs the capability of converting the play request based on time to the content fragment play request, the capability ID carried by the request message is tq.

The above capability ID may be carried in a Universal Resource Locator (URL) of the request message, and may also be carried in a message header or a message body.

405: The server receives the content description information request message from the client, reads the capability ID in the content description information request message, determines the HTTP streaming media capability used by the server, and meanwhile, determines the content description information to be delivered.

Generally, two situations exist.

In the first situation, the client uses the HTTP streaming media capability that is not enhanced, and the server uses the enhanced HTTP streaming media capability (the tq function).

At this time, the content description information delivered by the server is merely simple description information such as duration of media, a content coding format, and an access address.

In the second situation, the client uses the enhanced HTTP streaming media capability (the br function), and the server uses the HTTP streaming media capability that is not enhanced.

At this time, the content description information delivered by the server includes more description information, for example, further detailed metadata information which includes fragment information such as duration of each fragment, as well as a location and length of each fragment in the file, so that the client can independently calculate a content range of a requested fragment in the file.

If the server provides multiple versions of different bit rates for the same media content, a path (such as URL) for obtaining metadata information (such as the bit rate) and media content of the multiple versions also needs to be provided. Taking a 3GPP file format as an example, the content description information may be put in a metadata box, or the URL is provided, so that the client may obtain the required content description information at one time, in batches or selectively.

Generally speaking, the HTTP streaming media capabilities such as the play status control capability, the capability of converting the play request based on time to the content fragment play request, and the capability for the bit rate adaptation only need to be executed on one of the server and the client. That is to say, when the server obtains the HTTP streaming media capability supported by the client, the HTTP streaming media capability that used by the server can be determined.

406: The server delivers the content description information to the client.

407: The client requests a corresponding content fragment from the server according to the HTTP streaming media capability used by the client and the obtained content description information.

Generally, two situations exist.

In the first situation, the client uses the HTTP streaming media capability that is not enhanced, and the server uses the enhanced HTTP streaming media capability (the tq function).

At this time, the manner in which the client requests the corresponding content fragment from the server may be, but is not limited to, the following solutions.

1. Similar to an existing play control command of the streaming media, the specific play control command is described as follows:

http://www.example.com/requiredVoDContent/nbafinal.3gp?hsCommand=play;

http://www.example.com/requiredVoDContent/nbafinal.3gp?hsCommand=pause; if it is a seek operation, time information pointed by the seek also needs to be carried.

2. An HTTP header or message body is extended, and a specific application example is described as follows:

http://www.example.com/requiredVoDContent/nbafinal.3gp. The play command is used as a parameter and put in the extended header or message body, which specifically is: Pragma:hsCommand=play.

3. A manner of carrying a time parameter is used, and the specific example is described as follows:

http://www.example.com/requiredVoDContent/nbafinal.3gp?timeoffset=1200s.

Definitely, such application may also carry time information "timeoffset=1200s" in the extended HTTP header or message body.

In the second situation, the client uses the enhanced HTTP streaming media capability (the br function), and the server uses the HTTP streaming media capability that is not enhanced. At this time, the manner in which the client requests the corresponding content fragment from the server may be, but is not limited to, the solution as follows:

http://www.example.com/requiredVoDContent/nbafinal.3gp; and it is in dictated in the HTTP header that byte ranges of the corresponding fragment to be obtained are: bytes=1024-1560. Support for the byte ranges is provided by HTTP specifications.

408: The server delivers the content fragment to the client according to the content fragment request; and the client receives and plays the content fragment.

Figure 5:
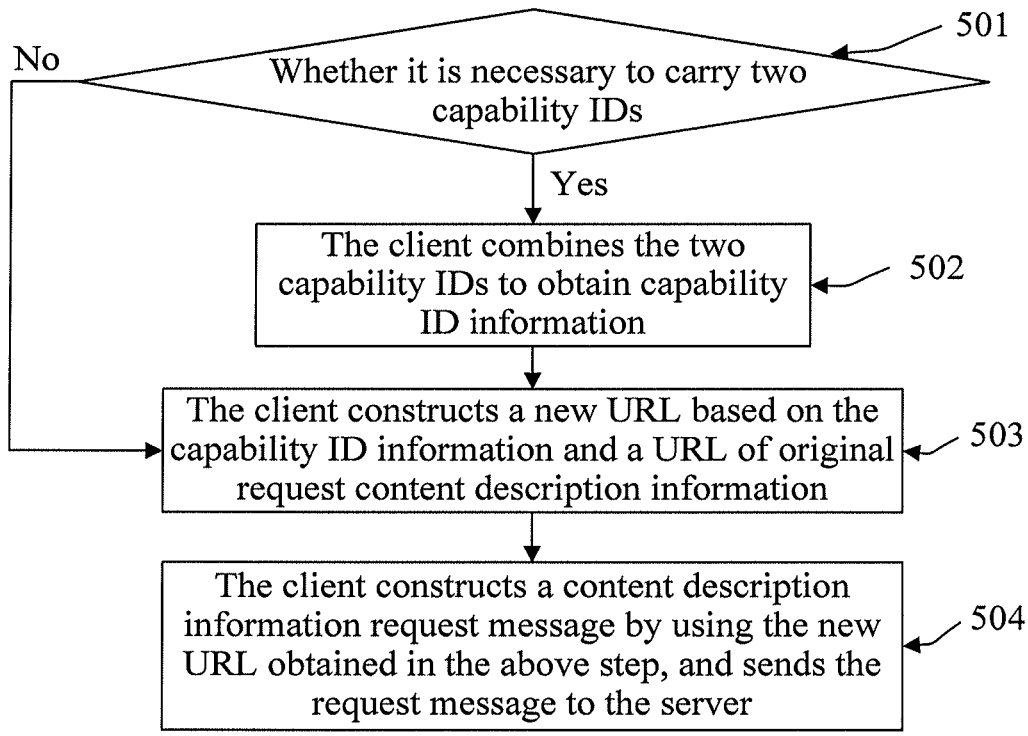
FIG. 5 is a flow chart of the specific implementation of step 404 in FIG. 4.

The specific implementation of step 404 of the above method that the client constructs the content description information request message and sends the request message to the server is shown in FIG. 5, which includes the following steps.

501: The client judges whether it is necessary to carry two capability IDs. If it is necessary to carry the two capability IDs, execute step 502; and if it is not necessary to carry the two capability IDs, execute step 503.

502: The client combines the two capability IDs to obtain capability ID information, for example, to obtain "br&tq", where br represents the br function and tq represents the tq function. For example, the br function refers to the capability of calculating the specific location of the content fragment in the file, so that the client can use the specific location of the content fragment to initiate the play request to the server; and the tq function refers to the capability of converting the play request based on time to the content fragment play request.

503: The client constructs a new URL based on the capability ID information and a URL of original request content description information. A construction principle is "original URL content? capability ID information", for example, http://www.example.com/requiredVoDContent/metadata.html?httpstreamingcapability=br&tq.

504: The client constructs the content description information request message by using the new URL obtained in the above step, and sends the request message to the server.

Figure 6:
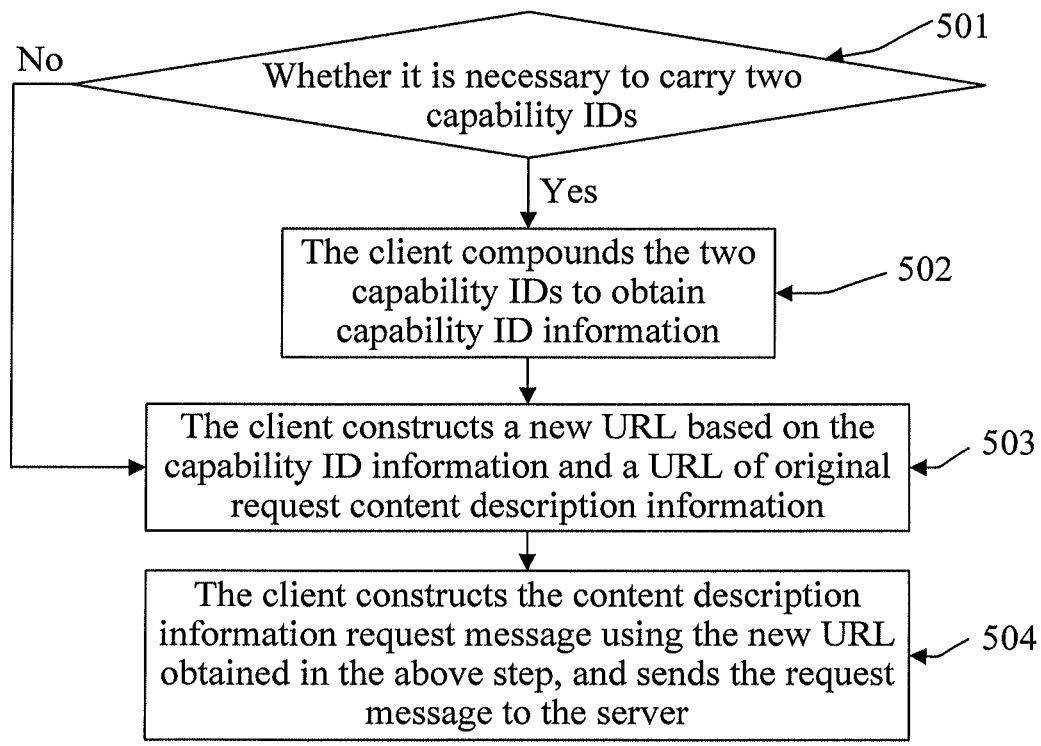
FIG. 6 is a flow chart of the specific implementation of step 405 in FIG. 4.

The specific implementation of step 405 of determining the HTTP streaming media capability used by the server and the content description information in the above method is shown in FIG. 6, which includes the following steps.

601: The server receives and parses the content description information request message sent by the client, and extracts the capability ID information in the request message. In this embodiment, the server parses the URL and extracts the capability ID information.

603: The server judges whether the capability ID information includes two capability IDs. If the capability ID information includes two capability IDs, execute step 604; and if the capability ID information does not include two capability IDs, execute step 605.

604: The server selects and determines the capability used by the server according to capability information used by a terminal, and executes step 606.

605: Since the client only supports one capability, the server determines to use a capability mode corresponding to that of the client, for example, if a br capability ID is carried in the request message, it represents that the client has the br function, and the server interacts with the client in the mode of supporting the br; while if a tq capability ID is carried in the request message, it represents that the client has the tq function, and the server interacts with the client in the mode of supporting the tq.

606: The server determines the content description information to be delivered according to the determined capability. In this step, the server may also put the selected capability information in the content description information. For example, the following two situations exist.

If the capability determined by the server is the br, the content description information delivered by the server includes more description information, for example, further detailed metadata information which includes fragment information such as duration of each fragment, as well as a location and length of each fragment in the file, so that the client can independently calculate a content range of a requested fragment in the file.

If the capability determined by the server is the tq, the content description information delivered by the server is merely simple description information such as duration of media, bit rates for selection, and an access address.

Figure 7:
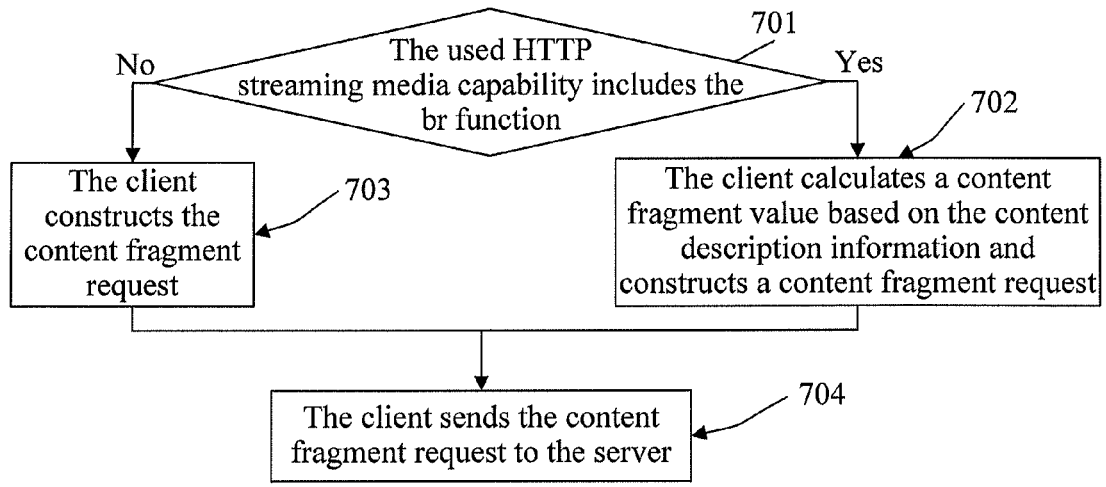
FIG. 7 is a flow chart of the specific implementation of step 407 in FIG. 4.

The specific implementation of step 407 in which the client requests the corresponding content fragment from the server in the above method is shown in FIG. 7, which may include the following steps.

701: The client judges whether the HTTP streaming media capability used by the client includes the br function according to the HTTP streaming media capability used by the client. The br function herein refers to the capability of calculating the specific location of the content fragment in the file, so that the client can use the specific location of the content fragment to initiate the play request to the server.

If the HTTP streaming media capability used by the client includes the br function, execute step 702; and if the HTTP streaming media capability used by the client does not include the br function, execute step 703.

702: The client calculates a content fragment value, namely a start location and length of the content fragment in a certain file of the server, based on the content description information, and then the client constructs a content fragment request and directly requests the corresponding fragment from the server through support of a standard HTTP for the br function in the request. After that, execute step 704.

703: The client constructs the content fragment request, and may carry start time of the requested content or a play control command parameter in the request, and then execute step 704.

704: The client sends the content fragment request to the server.

Figure 8:
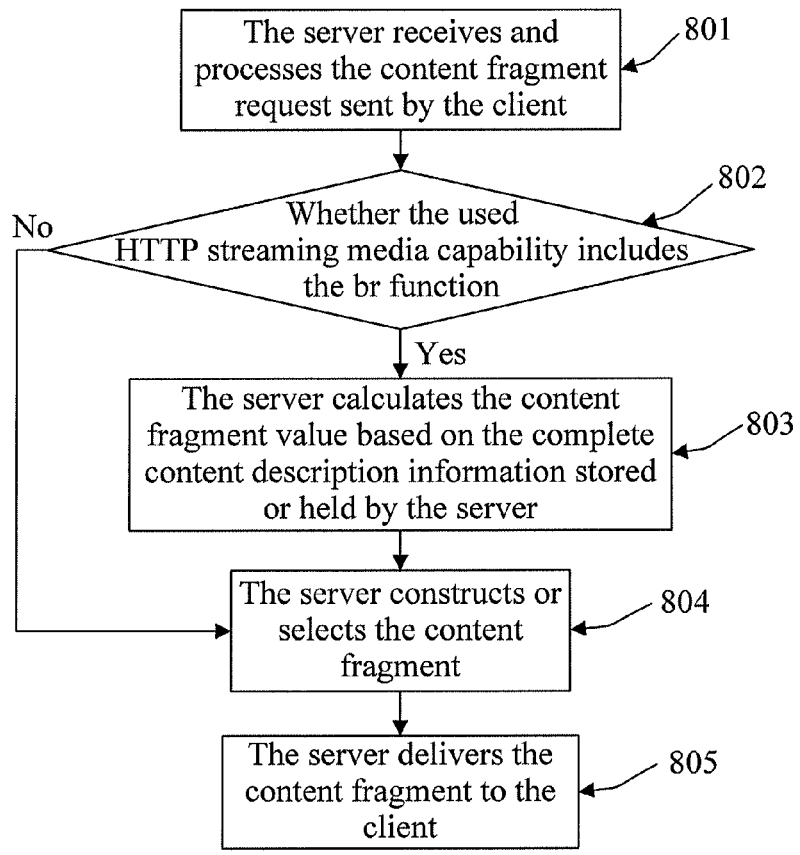
FIG. 8 is a flow chart of the specific implementation of step 408 in FIG. 4.

The specific implementation of step 408 in which the server delivers the corresponding content fragment to the client in the above method is shown in FIG. 8, which may in elude the following steps.

801: The server receives and processes the content fragment request sent by the client.

802: The server judges whether the HTTP streaming media capability used by the server includes the tq function, where the tq function refers to the capability of converting the play request based on time to the content fragment play request.

If the HTTP streaming media capability used by the server includes the tq function, execute step 803; and if the HTTP streaming media capability used by the server does not include the tq function, execute step 804.

803: The server calculates the content fragment value, namely the start location and length of the content fragment in a certain file, based on the complete content description information stored or obtained by the server, as well as the start time of the requested content (or the play control command parameter) carried in the content fragment request.

804: The server constructs or selects the content fragment. The server may need to assemble a content segment of the corresponding content fragment and fragment metadata information into the content fragment required by the client.

805: The server delivers the content fragment to the client.

It can be known through the descriptions of FIG. 4 to FIG. 8 that, by using the method for transmitting HTTP media according to the embodiments of the present disclosure, the server and the client can determine the HTTP streaming media capabilities used by the server and the client respectively. In this way, the server can clearly execute operations corresponding to the HTTP streaming media capability when providing the media services, and the client can also request and obtain the media according to the corresponding manner.

In the above embodiments, if the HTTP streaming media capability used by the client includes the br function, the content description information obtained by the client needs to include relatively detailed metadata information (references may be made to step 606), thereby obtaining relatively detailed information of the media content and a fragment situation, so as to obtain the location and length of the content fragment in the file through calculation subsequently. If the HTTP streaming media capability used by the client does not include the br function, the client only needs to obtain basic content metadata information such as the content duration and coding format, so that a player can complete initialization processing.

Figure 9:
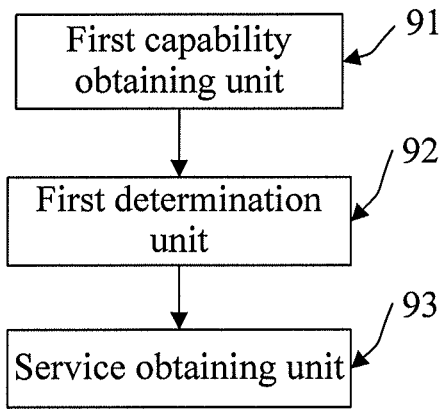
FIG. 9 is a block diagram of an apparatus for transmitting HTTP media according to Embodiment 2 of the present disclosure.

As shown in FIG. 9, the embodiment of the present disclosure further provides an apparatus for transmitting HTTP media. The apparatus includes a first capability obtaining unit 91, a first determination unit 92 and a service obtaining unit 93.

The first capability obtaining unit 91 is configured to obtain information of HTTP streaming media capabilities supported by a server and obtain information of HTTP streaming media capabilities supported by a client. In this embodiment, the first capability obtaining unit 91 is configured to receive the information of the HTTP streaming media capability supported by the server sent by the server, and obtain the information of the HTTP streaming media capability supported by the client. The first determination unit 92 is configured to determine the HTTP streaming media capability used by the server or the client in a subsequent media transmission procedure according to the obtained information of the HTTP streaming media capabilities supported by the server and the obtained information of the HTTP streaming media capabilities supported by the client. The HTTP streaming media capability used herein mainly refers to whether HTTP Streaming enhanced functions are executed on the client. The service obtaining unit 93 is configured to obtain media services according to the determined HTTP streaming media capability. For example, the service obtaining unit 93 is configured to send a content description information request message to the server according to the determined HTTP streaming media capability.

Generally speaking, the first capability obtaining unit 91 may obtain the information of the HTTP streaming media capability supported by the server through an EPG or an SG. Moreover, before the first capability obtaining unit 91 receives the information of the HTTP streaming media capability supported by the server sent by the server, the first capability obtaining unit 91 may initiate an HTTP streaming media capability determination request to the server.

In the above method and the system for transmitting HTTP media, information transmitted in the determined HTTP streaming media capabilities used by the server and the client in the subsequent media transmission procedure is carried in an existing message transmitting streaming media between the server and the client. That is to say, the information of the HTTP streaming media capabilities is directly carried in some existing messages, so that the client can determine the HTTP streaming media capabilities used by the client and the server can determine the HTTP streaming media capabilities used by the server, respectively. Definitely, in actual application, a dedicated message may be added between the server and the client. Then, HTTP streaming media capability notification and determination are performed by using the newly added dedicated message. For one of specific implementation manners, references may be made to Embodiment 4.

Embodiment 3

Figure 10:
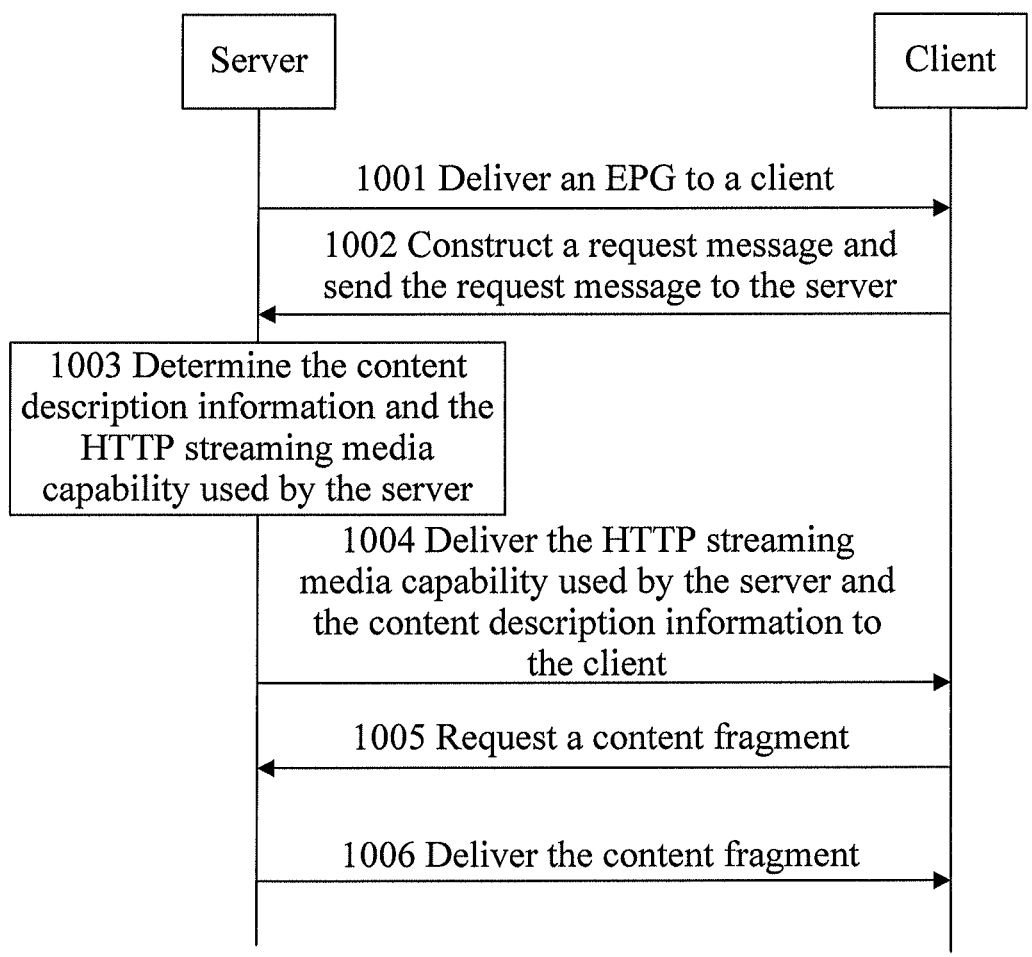
FIG. 10 is a flow chart of a method for transmitting HTTP media according to Embodiment 3 of the present disclosure.

The embodiment of the present disclosure provides a method and a system for transmitting HTTP media. A solution of performing HTTP streaming media capability notification and confirmation based on an EPG or based on an SG is taken as an example to illustrate an application of the method for transmitting HTTP media according to the embodiment of the present disclosure in detail. Referring to FIG. 10, the method for transmitting HTTP media includes the following steps.

1001: A server delivers an EPG to a client.

1002: After the client receives the EPG, the client constructs a content description information request message, and sends the content description information request message to the server. In this embodiment, the client carries an ID of HTTP streaming media capability supported by the client into the content description information request message. The capability ID may be carried in a URL of the content description information request message, or carried in a message header or a message body.

1003: The server receives the content description information request message from the client, reads the capability ID in the content description information request message, determines the HTTP streaming media capability used by the server, and meanwhile, determines the content description information to be delivered according to the determined HTTP streaming media capability used by the server. The specific content description information is the same as that of step 405 of Embodiment 2, and details are not described herein again.

Generally speaking, the HTTP streaming media capabilities such as a play status control capability, a capability of converting a play request based on time to a content fragment play request, and a capability for bit rate adaptation only need to be executed on one of the server and the client. That is to say, when the server obtains the HTTP streaming media capability supported by the client, the server can determine the HTTP streaming media capability used by the server.

1004: The server delivers the selected HTTP streaming media capability and the content description information to the client.

Through the content description information, the client may know the HTTP streaming media capability used by the server. Therefore, in the step, the client can determine the HTTP streaming media capability used by the client according to the HTTP streaming media capability supported by the client and the HTTP streaming media capability used by the server. For example, the HTTP streaming media capabilities supported by the server and the HTTP streaming media capabilities supported by the client both include: the play status control capability, the capability of converting the play request based on time to the content fragment play request, and the capability for bit rate adaptation. Then, if the server uses the above HTTP streaming media capabilities, the client is required not to use the above HTTP streaming media capabilities; and if the server does not use the above HTTP streaming media capabilities, the client is required to use the above HTTP streaming media capabilities.

1005: The client requests a corresponding content fragment from the server according to the HTTP streaming media capability used by the client and the received content description information. Specific information included in the content fragment request is the same as that of step 407 in Embodiment 2, and details are not described herein again.

1006: The server delivers the content fragment to the client according to the HTTP streaming media capability used by the server and the received content fragment request.

Figure 11:
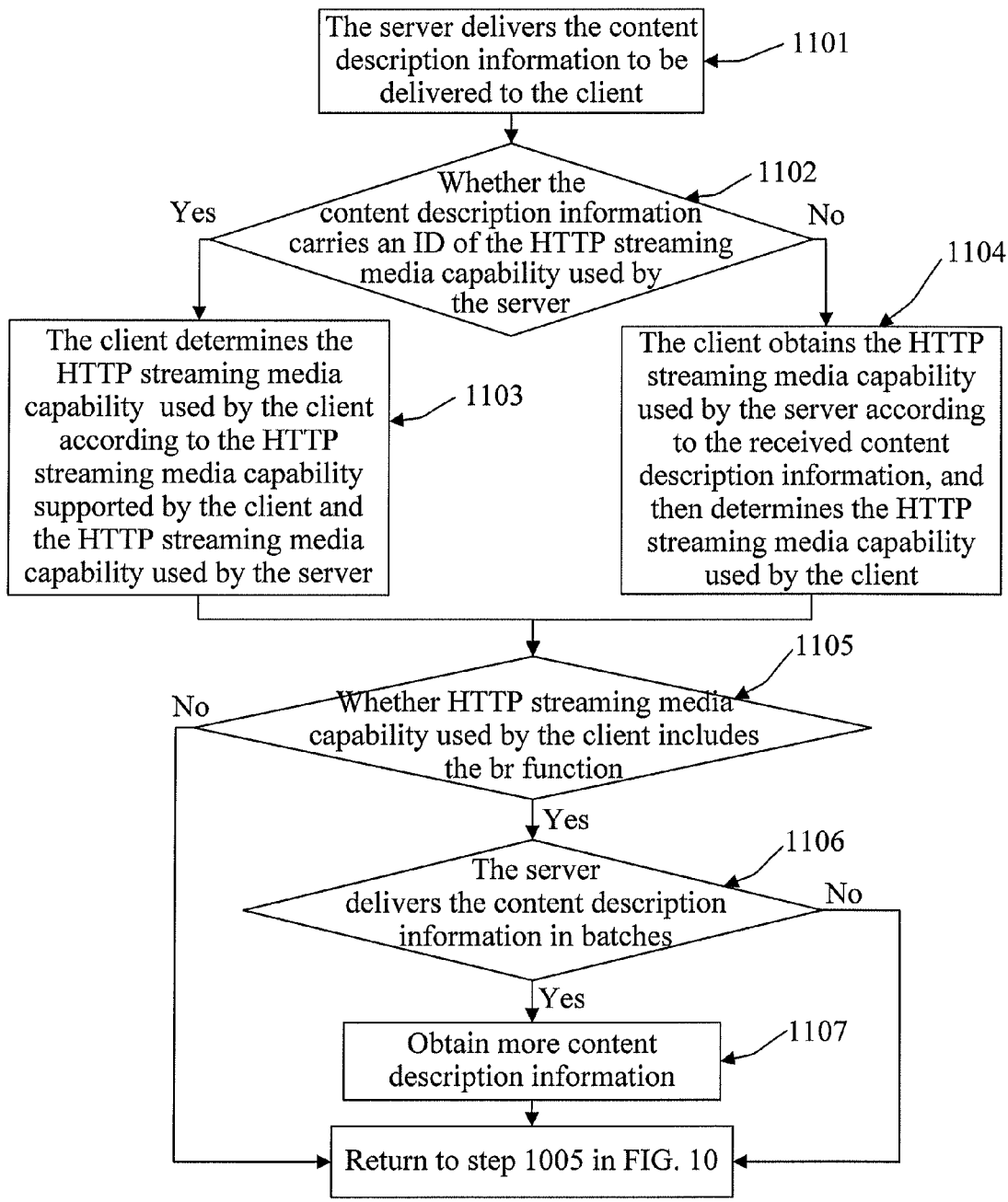
FIG. 11 is a flow chart of the specific implementation of step 1004 in FIG. 10.

The specific implementation of step 1004 in which the server delivers the content description information to the client in the above method is shown in FIG. 11, which includes the following steps.

1101: The server delivers the content description information to be delivered, which is determined in step 1003, to the client, where information of the HTTP streaming media capability used by the server may also be included in the content description information.

1102: The client judges whether the content description information carries an ID of the HTTP streaming media capability used by the server. If the capability ID is carried, execute step 1103; and if the capability ID is not carried, execute step 1104.

1103: The client determines the HTTP streaming media capability used by the client according to the HTTP streaming media capability supported by the client and the HTTP streaming media capability used by the server, and executes step 1105. For a specific manner of determining the HTTP streaming media capability that the client needs to use, references may be made to the description of step 1004 in FIG. 10.

1104: The client judges and obtains the HTTP streaming media capability used by the server according to the received content description information, for example, through judging the number of content items included in the content description information, or judging whether merely simple content description information or more content description information is included; or the server may provide a special parameter to indicate a type of the content description information. And then, the client determines the HTTP streaming media capability used by the client according to the HTTP streaming media capability supported by the client and the HTTP streaming media capability used by the server, and executes step 1105.

1105: The client judges whether the HTTP streaming media capability used by the client includes the br function. The br function herein refers to the capability of calculating a specific location of the content fragment in a file, so that the client can use the specific location of the content fragment to initiate a play request to the server; therefore, the br function means that the capability of converting the play request based on time to the content fragment play request in the server.

If the HTTP streaming media capability used by the client includes the br function, execute step 1106; and if the HTTP streaming media capability used by the client does not include the br function, end the process, return to step 1005 in FIG. 5 and execute step 1005.

1106: The client judges whether the server delivers the content description information in batches. If the server delivers the content description information in batches, which indicating that the client has not obtained all the content description information yet, execute step 1107. If the server does not deliver the content description information in batches, which indicating that the client has obtained all the content description information, end the process, and return to step 1005 in FIG. 10 and execute step 1005.

1107: The client continues to obtain more content description information. The client may obtain the more content description information selectively by using links provided in the foregoing content description information, or obtain all the content description information provided by the server in sequence. After all the content description information is obtained, end the process, and return to step 1005 in FIG. 10 and execute step 1005.

The specific implementation of step 1005 of the above method may be processed according to the steps shown in FIG. 7; and the specific implementation of step 1006 may be processed according to the steps shown in FIG. 8.

Figure 12:
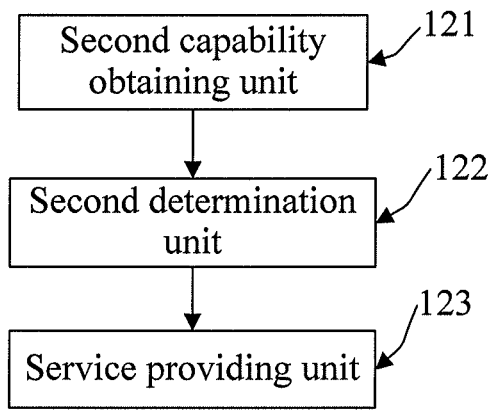
FIG. 12 is a block diagram of an apparatus for transmitting HTTP media according to Embodiment 3 of the present disclosure.

As shown in FIG. 12, the embodiment of the present disclosure further provides an apparatus for transmitting HTTP media. The apparatus includes a second capability obtaining unit 121, a second determination unit 122 and a service providing unit 123.

The second capability obtaining unit 121 is configured to obtain information of HTTP streaming media capabilities supported by a server and information of HTTP streaming media capabilities supported by a client. For example, the second capability obtaining unit 121 is configured to receive the information of the HTTP streaming media capability supported by the client sent by the client, or configured to obtain the information of the HTTP streaming media capability supported by the client pre-stored in a third party server, and to obtain the information of the HTTP streaming media capability supported by the server. The second determination unit 122 is configured to determine the HTTP streaming media capability used by the server or the client in a subsequent media transmission procedure according to the obtained information of the HTTP streaming media capabilities supported by the server and the obtained information of the HTTP streaming media capabilities supported by the client. The HTTP streaming media capability used herein mainly refers to that whether HTTP Streaming enhanced functions are executed on the server. The service providing unit 123 is configured to provide media services according to the determined HTTP streaming media capability. For example, the service providing unit 123 is configured to provide content description information to a client according to the determined HTTP streaming media capability. The client determines content to be requested according to the content description information.

In general cases, before the second capability obtaining unit 121 receives the information of the HTTP streaming media capability supported by the client sent by the client, the second capability obtaining unit 121 is further configured to initiate an HTTP streaming media capability determination request to the client.

In the above method and system for transmitting HTTP media, information transmitted in the determined HTTP streaming media capabilities used by the server and the client in the subsequent media transmission procedure is carried in an existing message transmitting streaming media between the server and the client. That is to say, the information of the HTTP streaming media capabilities is directly carried in some existing messages, so that the client can determine the HTTP streaming media capabilities used by the client and the server can determine the HTTP streaming media capabilities used by the server, respectively. Definitely, in actual application, a dedicated message may be added between the server and the client. Then, HTTP streaming media capability notification and determination are performed by using the newly added dedicated message. For one of specific implementation manners, references may be made to Embodiment 4.

Embodiment 4

In actual application, HTTP streaming media capability notification and HTTP streaming media capability determination may be performed by using different solutions and channels. For example, the solution may be, but is not limited to, the following ones.

In the first solution, a client may send information of an HTTP streaming media capability supported by the client to the server. The server determines the HTTP streaming media capability used by the server according to the received capability HTTP streaming media capability supported by the client and the HTTP streaming media capability supported by the server. Then, the server indicates the HTTP streaming media capability used by the client to the client. The solution is used by Embodiment 3. Definitely, before the client sends the capability HTTP streaming media capability supported by the client to the server, the server may initiate an HTTP streaming media capability determination request to the client.

In the second manner, the server may send information of the HTTP streaming media capability supported by the server to the client. The client determines the HTTP streaming media capability used by the client according to the received information of the HTTP streaming media capability supported by the server and the HTTP streaming media capability supported by the client. Then, the client indicates the HTTP streaming media capability used by the server to the server. The solution is used by Embodiment 2. Definitely, before the server sends the information of the HTTP streaming media capability supported by the server to the client, the client may initiate the HTTP streaming media capability determination request to the server.

Figure 13:
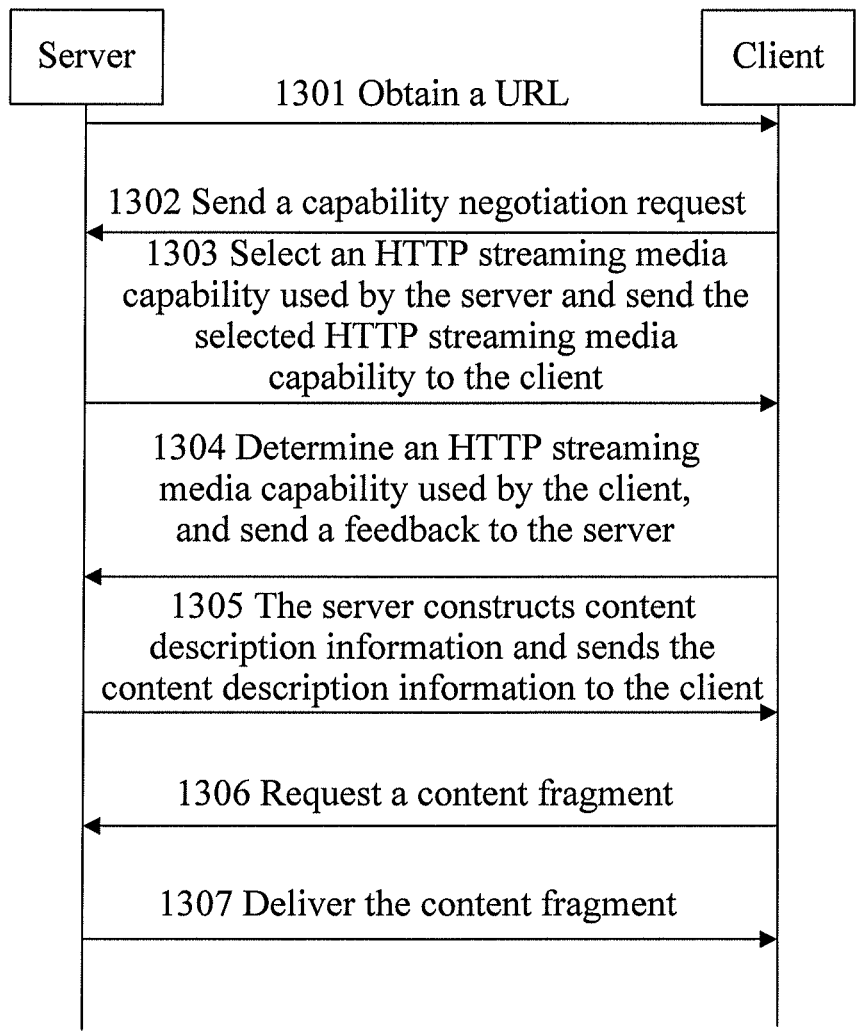
FIG. 13 is a flow chart of a method for transmitting HTTP media according to Embodiment 4 of the present disclosure.

In this embodiment, a dedicated message is added between the server and the client. The HTTP streaming media capability notification and the HTTP streaming media capability determination are performed by using the newly added dedicated message, which is equivalent to determining the HTTP streaming media capability used by the client and the server through a special negotiation procedure. As shown in FIG. 13, a specific procedure includes the following steps.

1301: When it is necessary to obtain media, the client obtains a URL corresponding to content to be requested. For example, the URL corresponding to content to be requested may be obtained through an EPG or a Web page delivered by the server.

1302: The client sends a capability negotiation request to the server. The capability negotiation request includes an ID of the HTTP streaming media capability supported by the client, where the ID may be br or tq. The br represents that the client can calculate a specific location of a content fragment, so that the client can use the specific location of the content fragment to initiate a play request to the server, which means a capability of converting a play request based on time to a content fragment play request in the server. The tq represents that the client needs to directly construct the play request based on time. If the client supports both of the HTTP streaming media capabilities, the client may report two capability IDs to the server.

1303: After receiving the capability negotiation request from the client, the server may select an HTTP streaming media capability used by the server, in an HTTP streaming media capability list supported by the server, and meeting requirements of both parties, and sends the HTTP streaming media capability used by the server to the client.

1304: After obtaining the HTTP streaming media capability used by the server, the client may determine an HTTP streaming media capability to be used by the client. In general cases, the client may further send a feedback to the server. Definitely, the client may also omit the step and not send the feedback to the server.

1305: The server constructs content description information according to the HTTP streaming media capability used by the server, and delivers the constructed content description information to the client.

1306: The client requests a corresponding content fragment from the server according to the HTTP streaming media capability used by the client.

1307: The server delivers the content fragment to the client according to the HTTP streaming media capability used by the server.

The specific implementation of step 1306 may be processed according to the steps shown in FIG. 7; and the specific implementation of step 1307 may be processed according to the steps shown in FIG. 8.

Through the above description, it can be known that, by using the method for transmitting HTTP media according to the embodiment of the present disclosure, both the server and the client can determine the HTTP streaming media capabilities used by the server and the client respectively. In this way, when providing media services, the server can clearly execute operations corresponding to the HTTP streaming media capability, and the client can also request and obtain media according to the corresponding manner.

The HTTP streaming media capabilities in Embodiment 1 to Embodiment 4 include: the play status control capability, the capability of converting the play request based on time to the content fragment play request, and the capability for bit rate adaptation. These capabilities may be distributed in the server and the client, and be implemented respectively. It is required that the same capability should not be implemented on the server and the client at the same time. For example, all the HTTP streaming media capabilities are implemented on the client or the server. Alternatively, the HTTP streaming media capability used by the server includes at least one of the HTTP streaming media capabilities, and the HTTP streaming media capability used by the client includes HTTP streaming media capabilities not used by the server among the HTTP streaming media capabilities.

Embodiment 5

When an HTTP Streaming capability is enhanced, functions enhanced in different servers may not be entirely the same, and functions enhanced in different clients may not be entirely the same; instead, some differences exist. In such situation, enhanced HTTP Streaming capabilities may be divided into capability sets according to the number of enhanced functions. Generally, the enhanced HTTP Streaming capabilities may be divided into at least two levels. Moreover, one of the server and the client uses the lowest HTTP streaming media capability, and the other uses the HTTP streaming media capability higher than the lowest HTTP streaming media capability. For example, a manner of level division of the HTTP streaming media capabilities may be, but is not limited to, dividing the level of the HTTP streaming media capabilities into a primary level, a medium level and a high level from low to high. Functions corresponding to each level are described as follows.

The primary HTTP streaming media capability has basic functions necessary for supporting the HTTP streaming media capability.

The medium HTTP streaming media capability adds, based on the primary level, a play control capability, and a capability of converting a play request based on time to a content fragment play request.

The high HTTP streaming media capability adds a capability for bit rate adaptation based on the medium level.

For the server, functions of each level are described in detail as follows.

For the primary HTTP streaming media capability, the server needs to support fragmentation and storage of media content according to requirements of HTTP Streaming Profile, and receive and process a request message based on a standard HTTP sent by the client.

For the medium HTTP streaming media capability, based on the primary HTTP streaming media capability, the server further supports play control, namely returning a requested content fragment to the client according to the play request based on time submitted by the client.

For the high HTTP streaming media capability, based on the medium HTTP streaming media capability, the server may actively select and return content fragments transited in terms of time but with different bit rates to a user upon the situation according to known information such as bandwidth.

For the client, functions of each level are described in detail as follows.

For the primary HTTP streaming media capability, the client needs to support operations similar to Real Time Streaming Protocol (RTSP) and carry parameters such as start time (even bit rates) in the request; moreover, the client needs to parse, play and display received metadata and the content fragment.

For the medium HTTP streaming media capability, based on the primary HTTP streaming media capability, the client further may know how to request a specific file through obtaining detailed content metadata, and calculates a location and length of a fragment corresponding to a request time point in a file, and obtains the corresponding content fragment from the server through a standard HTTP request.

For the high HTTP streaming media capability, based on the medium HTTP streaming media capability, the client actively requests content fragments of the same media content in files of versions with different bit rates from the server through detecting information such as the bandwidth, so as to implement bit rate adaptation.

Correspondingly, for the level division of the HTTP streaming media capabilities, the following requirements are presented. In order to support the HTTP Streaming, both the server and the client must support the HTTP Streaming Profile. In order to support the play control, at least one party of the enhanced server and the enhanced client needs to support the medium or high HTTP streaming media capability. When both the enhanced server and the enhanced client have the HTTP streaming media capability higher than or equal to the medium HTTP streaming media capability, a unique definite implementer or executer of the corresponding function set needs to be determined through negotiation.

In an IMS Internet Protocol Television (IPTV), an SIP message of the IMS or an existing session negotiation procedure may be fully used to complete the notification, negotiation and determination of HTTP Streaming capability information. Based on the previous embodiment of the capability set, the method for transmitting HTTP media in the IMS IPTV may be implemented through the following solution: adding an extended attribute in a Session Description Protocol (SDP) to indicate the HTTP streaming media capability supported by the client or the server, and using an SDP Offer/Answer mode to notify the supported HTTP streaming media capability; if both parties have the enhanced HTTP streaming media capability, the actual executer of the HTTP streaming media capability may be obtained through negotiation.

In the following, Enhanced_Level_0 represents the primary HTTP streaming media capability, Enhanced_Level_1 represents the medium HTTP streaming media capability, and Enhanced_Level_2 represents the high HTTP streaming media capability. Moreover, one of the server and the client is an initiator, and the other is a receiver. In this embodiment, two attributes, namely "a=httpProfile:attrValue1" and "a=hsControl:attrValue2", are extended in the SDP. For the attribute "a=httpProfile:attrValue1", a value of attrValue1 may be as follows:

HTTPProgressiveDownload
HTTPStreamingServer_Enhanced_Level_0
HTTPStreamingServer_Enhanced_Level_1
HTTPStreamingServer_Enhanced_Level_2
HTTPStreamingClient_Enhanced_Level_0
HTTPStreamingClient_Enhanced_Level_1
HTTPStreamingClient_Enhanced_Level_2

For the attribute "a=hsControl:attrValue2", a value of attrValue2 may be as follows:

Active: the initiator executes functions of play control/bit rate adaptation;

Ready: the initiator makes the other party choose whether the other party is willing to execute the functions of play control/bit rate adaptation; and Passive: the initiator does not support executing the functions of play control/bit rate adaptation.

In order to ensure that the both parties can complete the negotiation of the HTTP streaming media capability through one SDP Offer/Answer interaction, the initiator and the receiver may assign values to the SDP extended attributes according to the following table. Through the negotiation, the used HTTP streaming media capability may be obtained; and the actual implementer or executer of the functions such as the play control/bit rate adaptation may be obtained through negotiation when both parties support the HTTP Streaming. Definitely, if the client and the server only support the level of Enhanced_Level_0, since neither party is capable of acting as the executer of the play control, media content transmission in the HTTP Streaming mode is not supported in such situation.

When the client initiates an SDP Offer, and the server responds an SDP Answer, specific extended attributes of the SDP Offer and the SDP Answer are described in Table 1.

|  |  | Values of two extended attributes in SDP Answer | |
|---|---|---|---|
| Value of attrValue1 in SDP Offer | Value of attrValue2 in SDP Offer | a=httpProfile:HTTP-StreamingServer_Enhanced_Level_0 | a=httpProfile:HTTP-StreamingServer_Enhanced_Level_1 or 2 |
| HTTPStreaming-Client_Enhanced_Level_0 | Passive | Due to the lack of the executer of play control, lead to negotiation failure | a=hsControl:Active |
| HTTPStreaming-Client_Enhanced_Level_1 or 2 | Active | a=hsControl:Passive | a=hsControl:Passive |

-continued

| | | Values of two extended attributes in SDP Answer | |
|---|---|---|---|
| Value of attrValue1 in SDP Offer | Value of attrValue2 in SDP Offer | a=httpProfile:HTTP-StreamingServer_Enhanced_Level_0 | a=httpProfile:HTTP-StreamingServer_Enhanced_Level_1 or 2 |
| HTTPStreaming-Client_Enhanced_Level_1 or 2 | Ready | a=hsControl:Passive | a=hsControl:Active/Passive |

When the server actively initiates the SDP Offer, and the client responds the SDP Answer, the values of the extended attributes of the SDP Offer and the SDP Answer are described in Table 2.

| | | Values of two extended attributes in SDP Answer | |
|---|---|---|---|
| Value of attrValue1 in SDP Offer | Value of attrValue2 in SDP Offer | a=httpProfile:HTTP-StreamingClient_Enhanced_Level_0 | a=httpProfile:HTTP-StreamingClient_Enhanced_Level_1 or 2 |
| HTTPStreaming-Server_Enhanced_Level_0 | Passive | Due to the lack of the executer of play control, lead to negotiation failure | a=hsControl:Active |
| HTTPStreaming-Server_Enhanced_Level_1 or 2 | Active | a=hsControl:Passive | a=hsControl:Passive |
| HTTPStreaming-Server_Enhanced_Level_1 or 2 | Ready | a=hsControl:Passive | a=hsControl:Active/Passive |

Values are assigned to the HTTP Streaming extended attributes of the SDP according to Table 1 or Table 2, so that the server and the client can obtain the HTTP Streaming capability information of the other party through only one interaction. In addition, a result of the capability negotiation is definite and unique.

Figure 14:
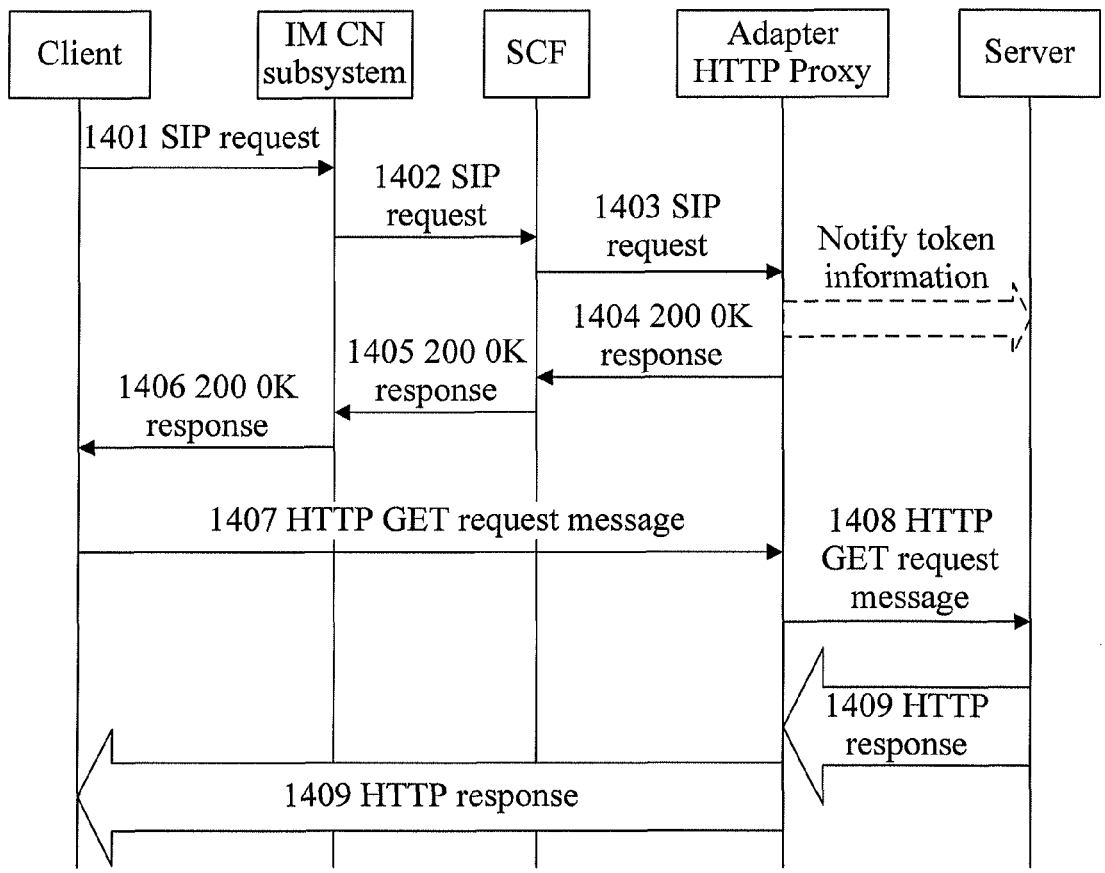
FIG. 14 is a flow chart of a method for transmitting HTTP media according to Embodiment 5 of the present disclosure.

The specific implementation of a method for transmitting HTTP media in the IMS IPTV is shown in FIG. 14, and the method includes the following steps.

1401: A client sends an SIP request to an IP Multimedia Core Network (IM CN) subsystem. The SIP request carries an extended SDP Offer. The SDP Offer adds extended attributes "a=httpProfile:attrValue1" and "a=hsControl:attrValue2". If the client supports a play control function, and intends to act as an executer of the function, the specific extended SDP Offer is as follows:

v=0
o=bob 2890844527 2890844527 IN IP4 b.biloxi.example.com
s=Download Session
i=A download session declared within the session description protocol
c=IN IP4 b.biloxi.example.com
t=0 0
m=application 8080 TCP 3gpp_http_download // indication of the http download
a=connection:new
a=setup:active
a=httpProfile:HTTPStreamingClient_Enhanced_Level_1
a=hsControl:Active // or Ready, for Enhanced_Level_0, the value can be Passive only
c=IN IP4 . . .
b=AS:15000 // bandwidth reserved by UE for CoD service (received from SSF or preconfigured)

1402: The IM CN subsystem sends an SIP request to an SCF to request the SCF to reserve an initial resource. In this step, the SIP request includes the extended attributes in step 1401.

1403: The SCF verifies whether a user has an access right to the requested content. When the user has the access right, the SCF sends an SIP request to an Adapter HTTP Proxy, and the SIP request in the step includes the extended attributes in step 1401.

1404: The Adapter HTTP Proxy maps a content ID to a file located on an HTTP server, and uses a special token to map an SIP session and a HTTP Progressive Download request in subsequent. Moreover, a message body of 200 OK response message sent to the SCP includes a URL corresponding to the file, an SDP Answer and the token. Meanwhile, the adapter HTTP Proxy also sends token information to the HTTP server for subsequent use.

The SDP Answer included in the 200 OK response message of the step is an extended SDP Answer, in which the extended attributes "a=httpProfile:attrValue1" and "a=hsControl:attrValue2" are added. If the Adapter HTTP Proxy needs to obtain the HTTP streaming media capability supported by the server, or the HTTP streaming media capabilities supported by the Adapter HTTP Proxy, and to set a corresponding attribute value in the SDP Answer according to the capability and the capability information carried in the SDP Offer, the SDP Answer used may be, but is not limited to, the one as follows:

v=0
o=alice 2890844526 2890844527 IN IP4 host.atlanta.example.com
s=Download Session
i=A download session declared within the session description protocol
c=IN IP4 host.atlanta.example.com
t=0 0
m=application 8080 TCP 3gpp_http_download // indication of the http download a=connection:new
a=setup:passive
a=httpProfile:HTTPStreamingServer_Enhanced_Level_0
a=hsControl:passive // the server does not execute the functions of play control/bit rate adaptation
c=IN IP4 . . .
b=AS:15000

1405: The SCP sends the 200 OK response message to the IM CN subsystem, where the response message at least carries the extended SDP Answer.

1406: The IM CN subsystem contacts the SCF to execute resource reservation, configures a policy execution mechanism, and then sends the 200 OK response message including the above SDP Answer and the URL to the client.

1407: After receiving the 200 OK response message, the client sends an HTTP GET request to the URL included in the SIP 200 OK message, where the HTTP GET request further includes an obtained token.

1408: The Adapter HTTP Proxy compares the token in the HTTP GET request and the stored token; and if the comparison is passed, the HTTP GET request is forwarded to the server.

1409: The server transmits an HTTP response to the client through the Adapter HTTP Proxy, where the response includes the requested content.

In the above solution, the HTTP streaming media capability is carried in the extended SDP Offer or SDP Answer. In actual application, the information of the HTTP streaming media capability of the server can also be carried through an SIP message; and the client reports the capability information of the client and a negotiation result to the server in a subsequent request message. That is to say, the SIP messages in step 1404 to step 1406 carry the information of the HTTP streaming media capability of the server, and the HTTP GET request in step 1407 carries the capability information of the client and the determined result.

By using the method for transmitting HTTP media according to the embodiment of the present disclosure, in the IMS, the server (or the Adapter HTTP Proxy) and the client can determine the HTTP streaming media capability used thereby, so that the server can clearly execute operations corresponding to the HTTP streaming media capability when providing media services, and that the client can also request and obtain media according to the corresponding manner. Therefore, it is avoided that media fails to be obtained since the same enhanced function is executed on both the server and the client.

Embodiment 6

Figure 15:
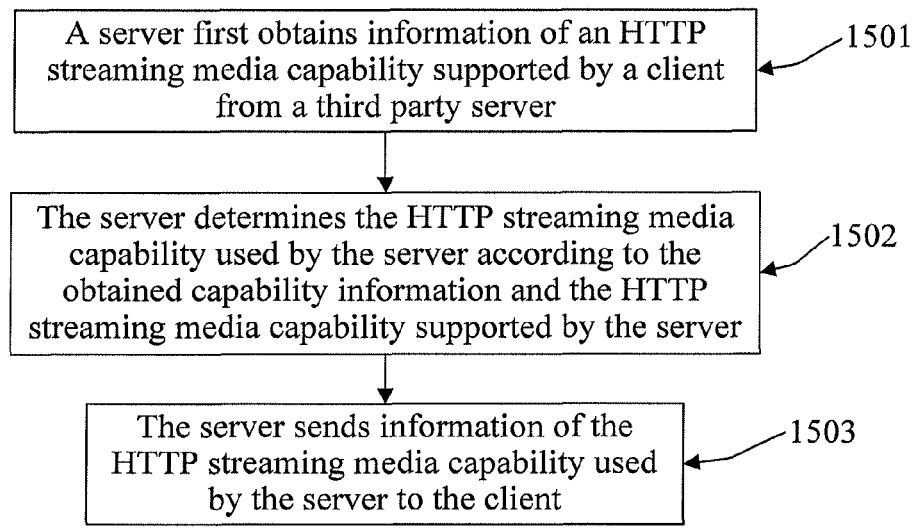
FIG. 15 is a flow chart of a method for transmitting HTTP media according to Embodiment 6 of the present disclosure.

In Embodiment 2 to Embodiment 5, a server and a client determine HTTP streaming media capabilities used by the server and the client through direct information interaction. This embodiment provides a solution of implementation through setting an extra third party server. In the third party server, the information of the HTTP streaming media capability of the client is stored. Generally speaking, the client may register the information of the HTTP streaming media capability of the client to the third party server during registration. As shown in FIG. 15, when the solution is used, a procedure that the server and the client determine the streaming media capabilities used by the server and the client is described as follows.

1501: A server first obtains information of an HTTP streaming media capability supported by a client from a third party server.

1502: The server determines the HTTP streaming media capability used by the server according to the obtained capability information and the HTTP streaming media capability supported by the server.

1503: The server sends information of the HTTP streaming media capability used by the server to the client. Since the client has already known the HTTP streaming media capability used by the server, the client determines the HTTP streaming media capability that the client needs to use according to the HTTP streaming media capability supported by the client and the HTTP streaming media capability used by the server. This is equivalent to that the server indicates the client the HTTP streaming media capability used by the client.

In a subsequent interaction procedure between the server and the client, when the server delivers metadata of an electronic program list, the server filters program content according to the HTTP streaming media capability supported by the client provided by the third party server, and only delivers media content meeting requirements to the client. If the client directly requests obtaining corresponding content description information from the server, the server may also obtain the HTTP streaming media capability supported by the client from the third party server, and then deliver the corresponding description information according to the HTTP streaming media capability supported by the client.

Figure 16:
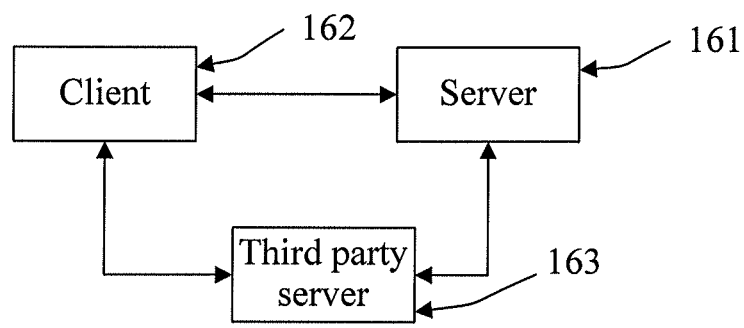
FIG. 16 is a block diagram of an apparatus for transmitting HTTP media according to Embodiment 6 of the present disclosure.

This embodiment also provides a system for transmitting HTTP media. As shown in FIG. 16, the system includes a server 161, a client 162 and a third party server 163.

The third party server 163 is configured to store the HTTP streaming capability supported by the client 162. The server 161 is configured to obtain information of the HTTP streaming media capability supported by the client 162 from the third party server 163, and determine the HTTP streaming media capability used by the server 161 according to the obtained capability information and the HTTP streaming media capability supported by the server 161. The server 161 is further configured to indicate the HTTP streaming media capability used by the client 162 to the client 162.

After determining the HTTP streaming media capabilities used by the server 161 and the HTTP streaming media capabilities used by the client 162, the server 161 is further configured to provide media services according to the determined HTTP streaming media capability; and the client 162 is further configured to obtain media according to the determined HTTP streaming media capability.

The embodiment of the present disclosure is mainly applied in various media obtaining systems such as an IMS and a system based on an EPG.

Through the above description of the embodiments, it is apparent to persons skilled in the art that the present disclosure may be accomplished by software on necessary universal hardware, and definitely may also be accomplished by hardware, but in most cases, the present disclosure is preferably implemented through the former method. Based on this, the solutions of the present disclosure or the part that makes contributions to the prior art can be substantially embodied in the form of a software product. The computer software product may be stored in a readable storage medium, for example, a floppy disk, a hard disk, or an optical disk of a computer, and contain several instructions adapted to instruct computer equipment having a processor (for example, a personal computer, a server, or network equipment) to perform the method according to the embodiments of the present disclosure.

The above is only the specific implementation of the present disclosure, but the protection scope of the present disclosure is not limited herein. Any change or replacement that can be easily figured out by persons skilled in the art within the technical scope disclosed by the present disclosure shall be covered by the protection scope of the present disclosure. Therefore, the protection scope of the present disclosure shall be the protection scope of the claims.

What is claimed is:

1. A method for transmitting Hypertext Transfer Protocol (HTTP) media from a server to a client device, comprising:
   obtaining, by the client, information of HTTP streaming media capabilities supported by the server having a processor, wherein the information of HTTP streaming media capabilities supported by the server is comprised in an Electronic Program Guide (EPG);
   determining, by the client, the HTTP streaming media capability used by the client in a subsequent media transmission procedure according to the obtained information of the HTTP streaming media capabilities supported by the server; and
   sending, by the client, a content description information request message according to the determined HTTP streaming media capability used by the client to the server, wherein the content description information request message comprises a capability ID that comprises a time based request (tq);
   receiving, by the client, content description information from the server, wherein, the content description information is determined by the server after the server determines, according to the tq in the content description information request message, that the server uses the enhanced HTTP streaming media capability; and the content description information comprises duration of media, a content coding format, and an access address when the server determines;
   sending, by the client, a content fragment request to a server, wherein the content fragment request carries at least one of following parameters, a start time of the requested content and a play control command parameter; and
   receiving, by the client, the content fragment from the server,
   wherein at least one of the server and the client use an enhanced HTTP streaming media capability, and the enhanced HTTP streaming media capability comprises play status control capability.

2. The method for transmitting HTTP media according to claim 1, wherein receiving, by the client, the information of the HTTP streaming media capability supported by the server sent by the server comprises: obtaining, by the client, the information of the HTTP streaming media capability supported by the server through an Electronic Program Guide (EPG) or a Service Guide (SG).

3. The method for transmitting HTTP media according to claim 1, wherein the HTTP streaming media capability comprises: a play status control capability, a capability of converting a play request based on time to a content fragment play request, and a capability for bit rate adaptation;
   the HTTP streaming media capability used by the server comprises all the HTTP streaming media capabilities; or
   the HTTP streaming media capability used by the client comprises all the HTTP streaming media capabilities; or
   the HTTP streaming media capability used by the server comprises at least one of the HTTP streaming media capabilities, and the HTTP streaming media capability used by the client comprises the HTTP streaming media capabilities not used by the server among the HTTP streaming media capabilities.

4. A method for transmitting Hypertext Transfer Protocol (HTTP) media from a server to a client, comprising:
   obtaining, by the client, information of HTTP streaming media capabilities supported by the server having a processor, wherein, the information of HTTP streaming media capabilities supported by the server is comprised in an Electronic Program Guide, EPG;
   determining, by the client, that the HTTP streaming media capability used by the client, in a subsequent media transmission procedure according to the obtained information of the HTTP streaming media capabilities supported by the server, is the enhanced HTTP streaming media capability; and
   sending, by the client, a content description information request message according to the determined HTTP streaming media capability used by the client to the server, wherein, the content description information request message comprises an identifier which identifies that the determined HTTP streaming media capability used by the client is the enhanced HTTP streaming media capability;
   receiving, by the client, content description information from the server, wherein, the content description information is determined by the server after the server determines that the server uses the HTTP streaming media capability that is not enhanced according to the identifier in the content description information request message; and based on the determined HTTP streaming media capability used by the server, the content description information comprises duration of fragment, location or length of fragment ;
   calculating based on the content description information, by the client, a content fragment value;
   sending, by the client, a content fragment request to a server, wherein the content fragment request carries the content fragment value; and
   receiving, by the client, the content fragment corresponding to the content fragment value from the server,
   wherein at least one of the server and the client use an enhanced HTTP streaming media capability, and the enhanced HTTP streaming media capability comprises play status control capability.

5. A client device comprising a non-transitory storage medium accessible by a hardware processor, the client device is configured to perform the following:
   obtaining information of HTTP streaming media capabilities supported by a server having a processor, wherein, the information of HTTP streaming media capabilities supported by a server is comprised in an Electronic Program Guide (EPG);
   determining the HTTP streaming media capability used by the client device in a subsequent media transmission procedure according to the obtained information of the HTTP streaming media capabilities supported by the server; and
   sending a content description information request message according to the determined HTTP streaming media capability used by the client device to the server, wherein, the content description information request message comprises a capability ID that comprises a time based request (tq);
   receiving content description information from the server, wherein, the content description information is determined by the server after the server determines, according to the tq in the content description information request message, that the server uses the enhanced HTTP streaming media capability; and the content description information comprises duration of media, a content coding format, and an access address when the server determines;

sending a content fragment request to a server, wherein the content fragment request carries at least one of following parameters, a start time of the requested content and a play control command parameter; and receiving the content fragment from the server, wherein the enhanced HTTP streaming media capability comprises play status control capability.

6. A client device comprising a non-transitory storage medium accessible by a hardware processor, the client device is configured to perform the following:

obtaining information of HTTP streaming media capabilities supported by the server having a processor, wherein, the information of HTTP streaming media capabilities supported by the server is comprised in an Electronic Program Guide (EPG);

determining that the HTTP streaming media capability used by the client, in a subsequent media transmission procedure according to the obtained information of the HTTP streaming media capabilities supported by the server, is the enhanced HTTP streaming media capability; and sending a content description information request message according to the determined HTTP streaming media capability used by the client to the server, wherein, the content description information request message comprises an identifier which identifies that the determined HTTP streaming media capability used by the client is the enhanced HTTP streaming media capability;

receiving content description information from the server, wherein, the content description information is determined by the server after the server determines that the server uses the HTTP streaming media capability that is not enhanced according to the identifier in the content description information request message; and based on the determined HTTP streaming media capability used by the server, the content description information comprises duration of fragment, location or length of fragment ;

calculating based on the content description information, by the client, a content fragment value;

sending a content fragment request to a server, wherein the content fragment request carries the content fragment value; and receiving the content fragment corresponding to the content fragment value from the server, wherein the enhanced HTTP streaming media capability comprises play status control capability.

* * * * *